J. H. MILKS & C. SCHMAND.
EGG BEATER.
APPLICATION FILED JULY 12, 1915.
1,178,255. Patented Apr. 4, 1916.
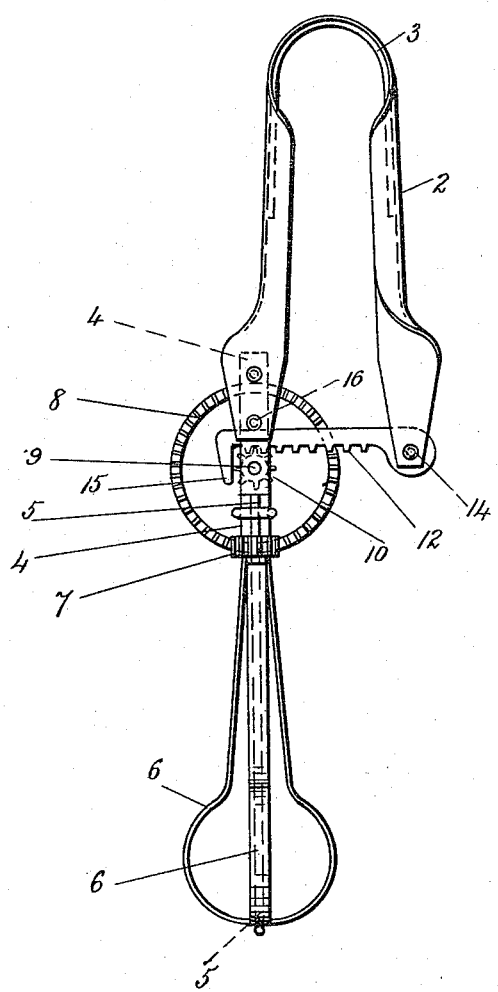
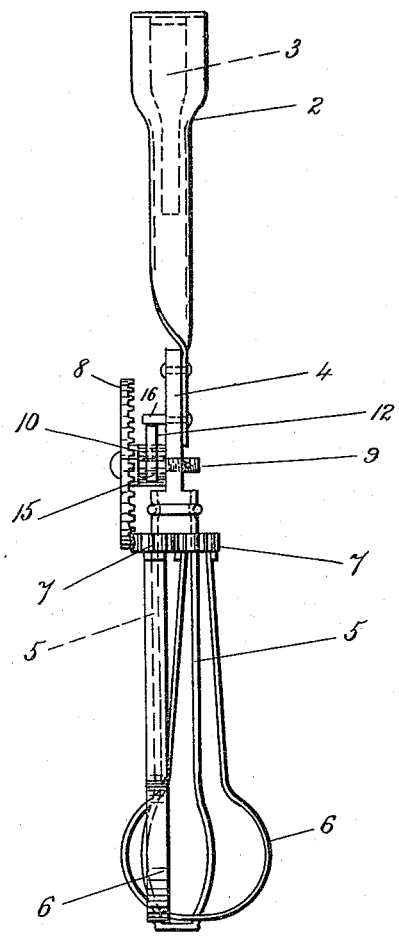
Inventors
John H. Milks and
Charles Schmand
By Herbert W. T. Jenner.
Attorney

UNITED STATES PATENT OFFICE.

JOHN H. MILKS AND CHARLES SCHMAND, OF GRAYS RIVER, WASHINGTON.

EGG-BEATER.

1,178,255.  Specification of Letters Patent.  Patented Apr. 4, 1916.

Application filed July 12, 1915. Serial No. 39,278.

*To all whom it may concern:*

Be it known that we, JOHN H. MILKS and CHARLES SCHMAND, citizens of the United States, residing at Grays River, in the county of Wahkiakum and State of Washington, have invented certain new and useful Improvements in Egg-Beaters, of which the following is a specification.

This invention relates to beaters for eggs and other similar materials; and it consists in the novel construction and combination of the parts hereinafter fully described and claimed, whereby the beater is adapted to be operated by one hand.

In the drawings, Figure 1 is a front view of a beater constructed according to this invention. Fig. 2 is a side view of the same.

A forked spring handle 2 is provided. This handle is preferably formed of thin sheet steel bent to shape and channel-shaped in cross-section where grasped by the hand. A reinforcing spring 3 is secured in the fork of the handle to strengthen the spring. One end portion of the handle has a bar or post 4 secured to it, and pivot rods 5 are secured to this post and project downwardly. Two intercurrent beaters 6 are provided, and are journaled on the pivot rods 5, and are provided with intergearing toothed pinions 7 at their upper ends. The beater mechanism is of any approved construction and may be varied in carrying out this invention.

A crown wheel 8 is journaled on a pin 9 which projects laterally from the post 4, and the teeth of this crown wheel gear into one of the pinions 7. A toothed pinion 10 is secured to one side of the crown wheel and forms its hub.

A toothed rack 12 is pivoted at one end to the other end portion of the forked spring handle, by a pin 14, and this rack rests on the pinion 10 and gears into its teeth. The free end portion of the rack is provided with a stop 15 which is normally pressed against the pinion by the spring handle. The rack 12 is arranged in a vertical plane with its teeth on its bottom edge, and it rests by gravity on the pinion 10 and is retained in gear with it by means of a stop pin 16 which projects from the post 4 over the top edge of the rack-bar 12.

The handle is grasped by one hand, and the other hand can be used to steady the basin in which the eggs are beaten, so that it is not overturned as is frequently the case when both hands are required to operate the beater mechanism. The beaters are revolved first in one direction and then in the other direction by the action of the hand on the forked spring handle, and the operation of beating the eggs is performed with greater expedition than when the beaters are revolved continuously in one direction.

What we claim is:

In an egg beater, a forked spring handle, a vertical post having its upper end portion secured to one end portion of the handle, beater mechanism attached to the lower end portion of the post and provided with a driving pinion arranged to revolve in a horizontal plane, a pin which projects laterally from the middle part of the post, a toothed pinion and a toothed crown wheel secured together and mounted to revolve on the said pin, said crown wheel gearing into the aforesaid driving pinion, and a toothed rack-bar pivoted to the other end portion of the handle and arranged to work in a vertical plane in the space between the post and the crown wheel and having teeth on its bottom edge which gear into the pinion secured to the crown wheel.

In testimony whereof we affix our signatures.

JOHN H. MILKS.
CHARLES SCHMAND.

Copies of this patent may be obtained for five cents each, by addressing the "Commissioner of Patents, Washington, D. C."